United States Patent

Bartoe, Jr. et al.

[15] 3,688,029

[45] Aug. 29, 1972

[54] CABLELESS ACOUSTICALLY LINKED UNDERWATER TELEVISION SYSTEM

[72] Inventors: Otto E. Bartoe, Jr., 621 Aurora, Boulder, Colo. 80302; Virgil R. Tucker, 910 Crescent Drive, Boulder, Colo. 80303; Ronald D. Wertz, 2005 Vassar Drive, Boulder, Colo. 80904

[22] Filed: Sept. 23, 1968

[21] Appl. No.: 761,469

[52] U.S. Cl. ...........178/6.8, 178/DIG. 3, 179/1 UW, 340/5 MP

[51] Int. Cl. ...............................................H04n 7/12

[58] Field of Search............325/28, 103, 316, 56, 26; 340/5 MP, 5 T; 178/6.8, 6 B, DIG. 3, 16 B WR; 179/1 UW, 20 P, 2 TV

[56] References Cited

UNITED STATES PATENTS

| | | | |
|---|---|---|---|
| 2,798,902 | 7/1957 | Kursman et al. | 179/1 |
| 3,218,607 | 11/1965 | Brock et al. | 325/28 X |
| 3,277,429 | 10/1966 | Hammond, Jr. | 340/5 X |
| 3,351,900 | 11/1967 | Yamamoto et al. | 340/5 X |
| 3,405,387 | 10/1968 | Koomey et al. | 340/5 |
| 3,422,397 | 1/1969 | La Goe | 340/5 |
| 3,436,474 | 4/1969 | Saeger et al. | 178/7.1 |
| 3,461,231 | 8/1969 | Quinlan | 178/6.8 |
| 2,459,281 | 1/1949 | McDonald | 325/103 X |
| 2,929,869 | 3/1960 | Hines et al. | 178/6 R |
| 3,526,709 | 9/1970 | Butterworth et al. | 178/6.8 |

OTHER PUBLICATIONS

Article " Underwater Communication" The Journal of the Acoustical Society of America Vol. 28, No. 4 pp. 556, 557 July 1956.

*Primary Examiner*—Robert L. Griffin
*Assistant Examiner*—Richard K. Eckert, Jr.
*Attorney*—Campbell, Harris & O'Rourke

[57] ABSTRACT

A cableless television system for viewing an underwater scene and acoustically transmitting data indicative of the scene to the surface for substantially immediate presentation. The system generates data signals indicative of the camera scene at a predetermined slow scan rate and utilizes data encoding prior to conversion to acoustic energy for transmission. After transmission, the received acoustic energy is reconstituted for video presentation and/or recording. Three separate modes of operation are provided – an FM mode, a delta modulation mode, and a PCM mode. The system also includes acoustical transmission of commands for remote control of the underwater unit and circuitry for verifying unit performance and establishing location.

20 Claims, 11 Drawing Figures

INVENTORS
OTTO E. BARTOE, JR.
VIRGIL R. TUCKER
RONALD D. WERTZ
BY
Campbell, Harris & O'Rourke
ATTORNEYS INVENTORS
OTTO E. BARTOE, JR.
VIRGIL R. TUCKER
RONALD D. WERTZ
BY
Campbell, Harris & O'Rourke
ATTORNEYS INVENTORS
OTTO E. BARTOE, JR
VIRGIL R. TUCKER
RONALD D. WERTZ
BY
Campbell, Harris & O'Rourke
ATTORNEYS INVENTORS
OTTO E. BARTOE, JR.
VIRGIL R. TUCKER
RONALD D. WERTZ
BY
Campbell, Harris & O'Rourke
ATTORNEYS INVENTOR.
OTTO E. BARTOE, JR.
VIRGIL R. TUCKER
RONALD D. WERTZ
BY
Campbell, Harris & O'Rourke
ATTORNEYS INVENTORS
OTTO E. BARTOE, JR.
VIRGIL R. TUCKER
RONALD D. WERTZ
BY
Campbell, Harris & O'Rourke
ATTORNEYS INVENTORS
OTTO E. BARTOE, JR.
VIRGIL R. TUCKER
RONALD D. WERTZ
BY
Campbell, Harris & O'Rourke
ATTORNEYS INVENTORS
OTTO E. BARTOE, JR.
VIRGIL R. TUCKER
RONALD D. WERTZ
BY
Campbell, Harris & O'Rourke
ATTORNEYS INVENTOR.
OTTO E. BARTOE, JR
VIRGIL R. TUCKER
BY RONALD D. WERTZ
Campbell, Harris & O'Rourke
ATTORNEYS INVENTORS
OTTO E. BARTOE, JR.
VIRGIL R. TUCKER
RONALD D. WERTZ
BY
Campbell, Harris & O'Rourke
ATTORNEYS

CABLELESS ACOUSTICALLY LINKED UNDERWATER TELEVISION SYSTEM

BACKGROUND OF THE INVENTION

1. Field of the Invention

This invention relates to a cableless acoustically linked television system and more particularly to a cableless television system for use in viewing an underwater camera scene and acoustically transmitting data indicative of the scene through the water medium to the surface for presentation.

2. Description of the Prior Art

Although some communication systems have been developed to a high degree over the past few years, there is still great difficulty experienced in attempting cableless communication through mediums more dense than air. This is particularly true, for example, in attempting communication through a water medium.

Many attempts have been made heretofore to transmit intelligence through a water medium. While some devices have been at least partially successful in transmitting intelligence, none of these devices have proved to be completely acceptable due, at least in part, to the frequencies utilized and/or range limitations necessarily imposed. In addition, no acceptable device has been found for transmission of television signals utilizing an acoustic link.

Where video data representative of a television camera scene has been involved, it has therefore been necessary heretofore to either record the data at the submerged unit and later recover the unit to thereby recover the recorded information, or utilize a cable extending from surface equipment to the submerged unit. Both of these systems have obvious disadvantages, including the time delays and danger of information loss when recording the information in the submerged unit, and the depth and related weight limitations when utilizing a cable attached to the submerged unit.

SUMMARY OF THE INVENTION

This invention provides a system for remote viewing of a camera scene utilizing an acoustic telemetry link and is therefore particularly well suited for surface viewing of an underwater camera scene with data indicative of the scene being converted to acoustic energy for transmission through the water medium and thereafter reconstituted for substantially immediate presentation.

It is therefore an object of this invention to provide a cableless acoustically linked television system.

It is another object of this invention to provide a cableless acoustically linked television system that is particularly well suited for use with a submerged unit for substantially immediate presentation of an underwater camera scene at a surface-located unit.

It is still another object of this invention to provide an acoustically linked image display system wherein data indicative of a camera scene is converted into acoustic energy for transmission and reconverted after transmission into video intelligence signals which can then be utilized for faithful reproduction of the camera scene.

It is yet another object of this invention to provide an acoustically linked television system having a slow scan readout for producing a digital signal which is converted to acoustic energy prior to transmission.

It is still another object of this invention to provide an acoustically linked television system having selectable modes of transmission.

It is still another object of this invention to provide an acoustically linked television system wherein video information is transmitted by said acoustic link from a video camera and command information is transmitted by said acoustical link to said video camera for remote control thereof.

It is yet another object of this invention to provide an underwater unit for developing a video signal and converting the same acoustic energy for transmission.

It is another object of this invention to provide a surface unit capable of receiving acoustic energy indicative of camera scene intelligence and reconstituting the signal for presentation.

It is still another object of this invention to provide a method for transmitting a television signal utilizing an acoustic link.

With these and other objects in view, which will become apparent to one skilled in the art as the description proceeds, this invention resides in the novel construction, combination, arrangement of parts, and method substantially as hereinafter described and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE PREFERRED EMBODIMENT

Figure 1:
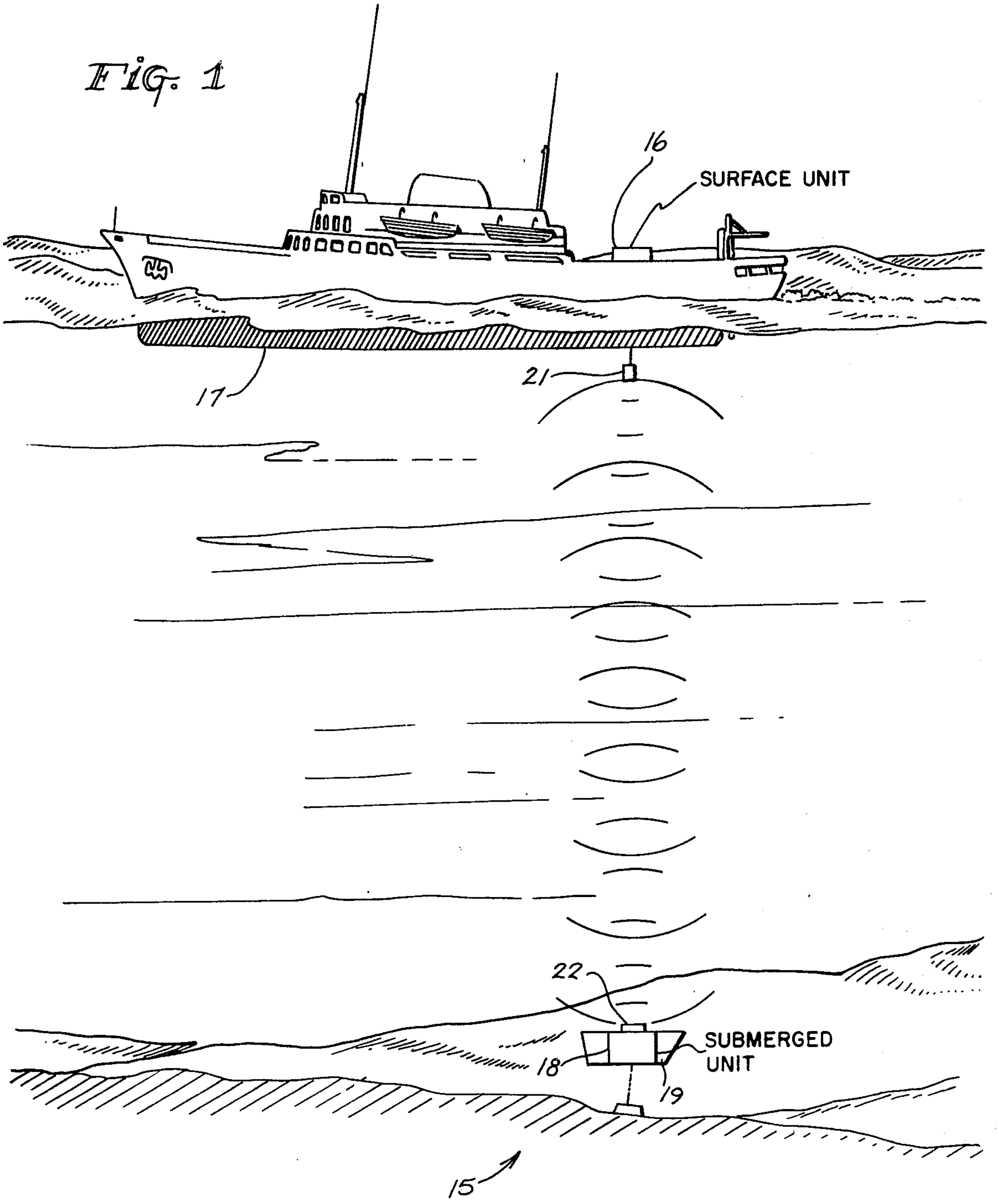
FIG. 1 is a perspective illustrative view of the cableless acoustically linked television system of this invention showing a submerged unit in communication with a surface unit.

Referring now to the drawings, the numeral 15 refers generally to the cableless acoustically linked television system of this invention, which includes a master unit 16 and a slave unit 18. As shown in FIG. 1, master unit 16 is a surface unit and may be located aboard a surface vessel 17, while the slave unit 18 is a submerged unit and may be submerged in a submergible vessel 19, wherein the unit can be positioned, for example, contiguous to the ocean floor.

It is a feature of this invention that the units are linked for communication purposes by means of acoustic telemetry. As indicated in FIG. 1, this link is established by utilization of a pair of electro-acoustical transducers 21 and 22, with electro-acoustical transducer 21 being connected with surface unit 16 and electro-acoustical transducer 22 being connected with submerged unit 18. The electro-acoustical directional transducers may be conventional and, as is also conventional, direct transmitted acoustic energy toward one another through the water medium in which both are immersed. As would be obvious, each transducer may be maintained at a distance from the unit and carrier with which it is associated to maximize link effectiveness.

The transmission of acoustic energy through a water medium is restricted both as to the frequencies and transmission distances that can be successfully utilized. Hence, careful selection is required to realize a proper frequency range that will enable achievement of the desired end without departing from practicality with respect to power requirements for the transmission distances sought.

At low frequencies, it has been found that the ambient noise levels in the sea predominate up to about 6 kHz, and that this ambient noise level tapers off, at least to some extent, at higher frequencies. While this would indicate the desirability of utilizing high frequencies, the advantages to be gained are offset by the fact that signals transmitted through a water medium are attenuated logarithmically as frequency is increased. It is therefore necessary to achieve a balance between these conflicting limitations to obtain optimum results. In addition, since one unit is to be submerged and has weight and space limitations, the amount of power available for transmission of the signal must be limited, from a practical standpoint, and this, of course, is also a transmission distance-limiting factor.

Ambient noise, which as stated hereinabove becomes somewhat less noticeable above about 6 kHz, is commonly recognized as being due to: thermal noise caused by molecular agitation in the medium; sea-surface noise associated with waves; biological noise caused by sea creatures; man-made noises such as from ships, buoys, industrial operations, and the like; rain; surf on coast or reefs; flow noise caused by current flow off irregular bottoms; and terrestrial noise such as caused by quakes, storms, volcanoes, and the like. Of these, biological noise, flow noise, and terrestrial noise can be disregarded as an appreciable factor because of the relatively shallow water occurrence of biological noise and the low frequencies of floor noise and terrestrial noise.

Although ambient noise levels will vary considerably with changes in sea conditions, it has been found that acoustic transmission at frequencies above about 8 kHz is desirable. In addition, lack of practical utilizable bandwidth hampers operation at low frequencies.

As brought out hereinabove, signal attenuation increases as frequency is increased, and it has been found that attenuation of signals above about 20 kHz so adversely affects transmission range as to make the higher frequency signals undesirable for practical application, except for very short transmission, for example, of a few hundred yards as could occur in shallow water applications.

It has therefore been found desirable that most effective acoustic linking is realized when the units are operated between about 8 kHz and 20 kHz, depending upon conditions encountered and range required. As brought out hereinabove, transmission range through a water medium is rather limited and, as also brought out hereinabove, it is advantageous to maintain the acoustic link as short as practically possible. Therefore, by choosing an acoustic link having a range of at least 5 miles, the submerged unit could maintain the transmission link with the surface unit even if on the ocean floor so long as the unit is fairly near a vertical relationship with the surface unit.

To accomplish such a transmission link, it is necessary to utilize frequencies within the optimum range to avoid undue attenuation and ambient noise. Since video data is to be transmitted, it has been found that such data can be transmitted if properly processed prior to transmission. It is another feature of this invention to provide such processing, which processing preferably includes a slow scan readout of the video camera scene and encoding of the readout prior to conversion to acoustic energy for transmission. It is also another feature of this invention that three modes of operation can be utilized - FM, delta modulation, and PCM.

The number of pulses required for a single frame TV picture will, of course, vary depending upon the resolution desired. Since it generally requires from two to five cycles for reasonable detection efficiency in a communication system and transducers can be frequency shifted during one cycle, the maximum number of information pulses for a given carrier frequency is about 0.2 times the carrier frequency.

Thus, if a 14.5 kHz carrier frequency is utilized, a 24 volt battery, a peak current of 3.0 amperes and a picture frame requiring 80,000 information bits, data sampling at the rate of 1,250 samples per second with two bits per sample requires 32 seconds per frame and consumes 2,304 watt seconds. It has been found that with this invention, the time required can be as little as 10 seconds for an 80–line picture with a 14.5 kHz transmitter frequency and a video bandpass of 500 Hz. Thus, it can be readily seen that a camera scene can be sensed, processed, transmitted, received, reconstructed, and presented in near real time by use of this invention.

Figure 2:
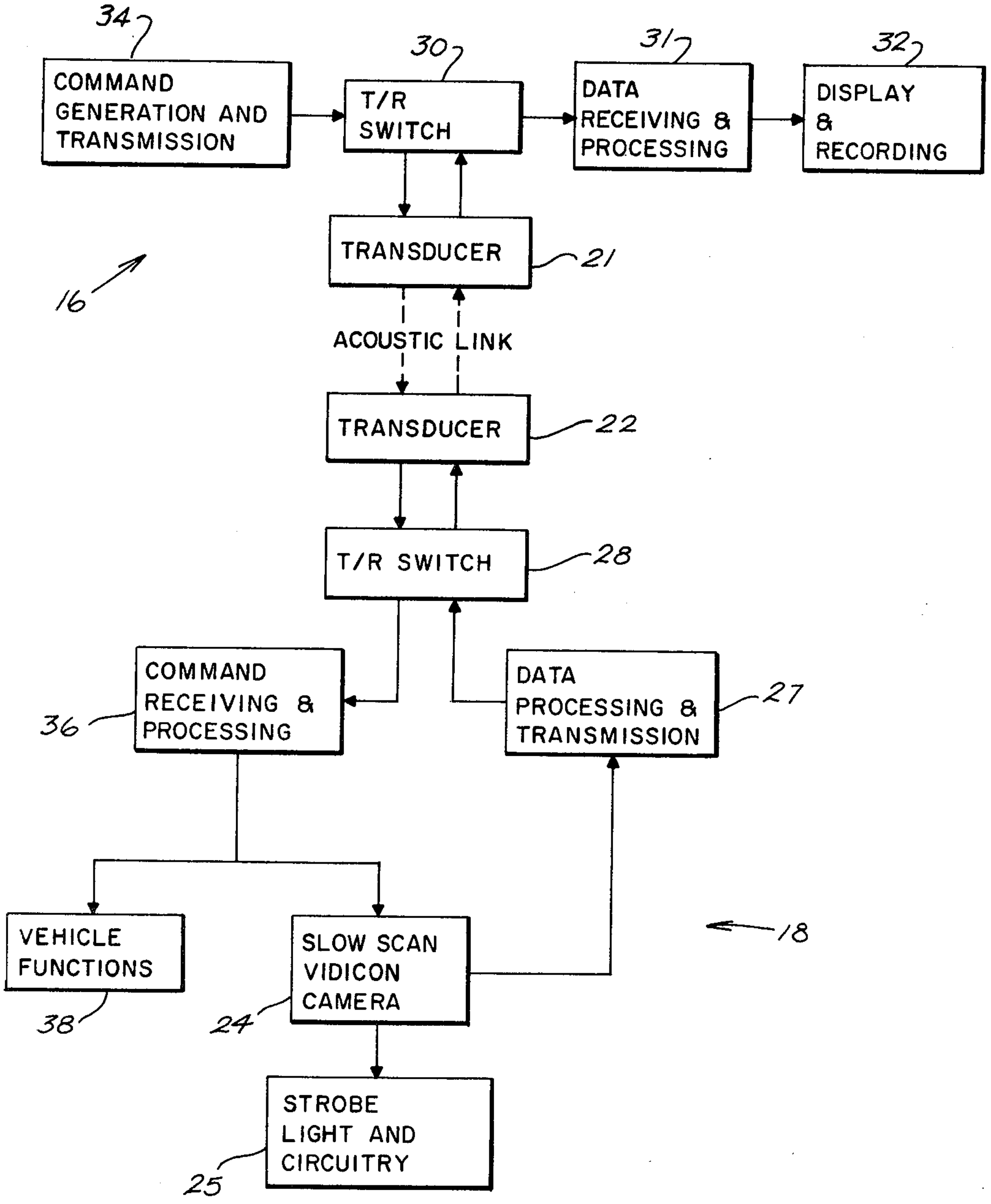
FIG. 2 is a block diagram presentation of the cableless acoustically linked television system of this invention.

Referring now to FIG. 2, a block diagram of the system of this invention is shown. A video camera unit 24 (slow scan vidicon camera unit) is provided in submergible unit 18, which camera unit preferably includes a vidicon tube capable of storing the camera scene on the face of the tube for a period of time, as is well known in the art. Video camera unit 24 is connected with strobe light and circuitry unit 25 so that as the camera is activated to record a viewed scene, a conventional and suitable pressure tight strobe light, usually a xenon tube, is caused to flash by conventional strobe circuitry which can include, for example, a charging capacitor that is discharged through the light to cause the flash, as is also well known in the art.

The information stored on the face of the vidicon tube is read out by slow scan techniques so as to provide output data at a predetermined rate less than real time, as is necessary to facilitate the necessarily slow transmission link. The video data is then coupled through data processing and transmission unit 27 and transmitreceive switch 28 to conventional electro-acoustic transducer 22, where the modulated video data is converted to acoustic energy for transmission through the water medium.

After transmission, the acoustic energy is received by electro-acoustic transducer 21 connected with surface unit 16. This energy is then coupled through transmit-receive switch 30 to data receiving and processing unit 31. The output from data receiving and processing unit 31 is then coupled to a display and recording device 32.

As is also shown in FIG. 2, video camera 24 is remotely controlled by commands from the surface unit. Command generation and transmission unit 34 provides command signals which are coupled through transmitrecieve switch 30 to the electro-acoustic transducer 21 where the command signals are converted to acoustic energy and transmitted through the water medium.

The acoustic energy is received by electro-acoustic transducer 22 connected with the submergible unit 18. The acoustic energy received at the submergible unit 18 is coupled through transmit-receive switch 28 to a command receiving and processing unit 36 the outputs from which control the slow scan vidicon camera unit 24 and the various vehicle functions identified generally by the numeral 38, which could include, for example, release of an anchor to allow the unit to surface when desired.

Figure 3:
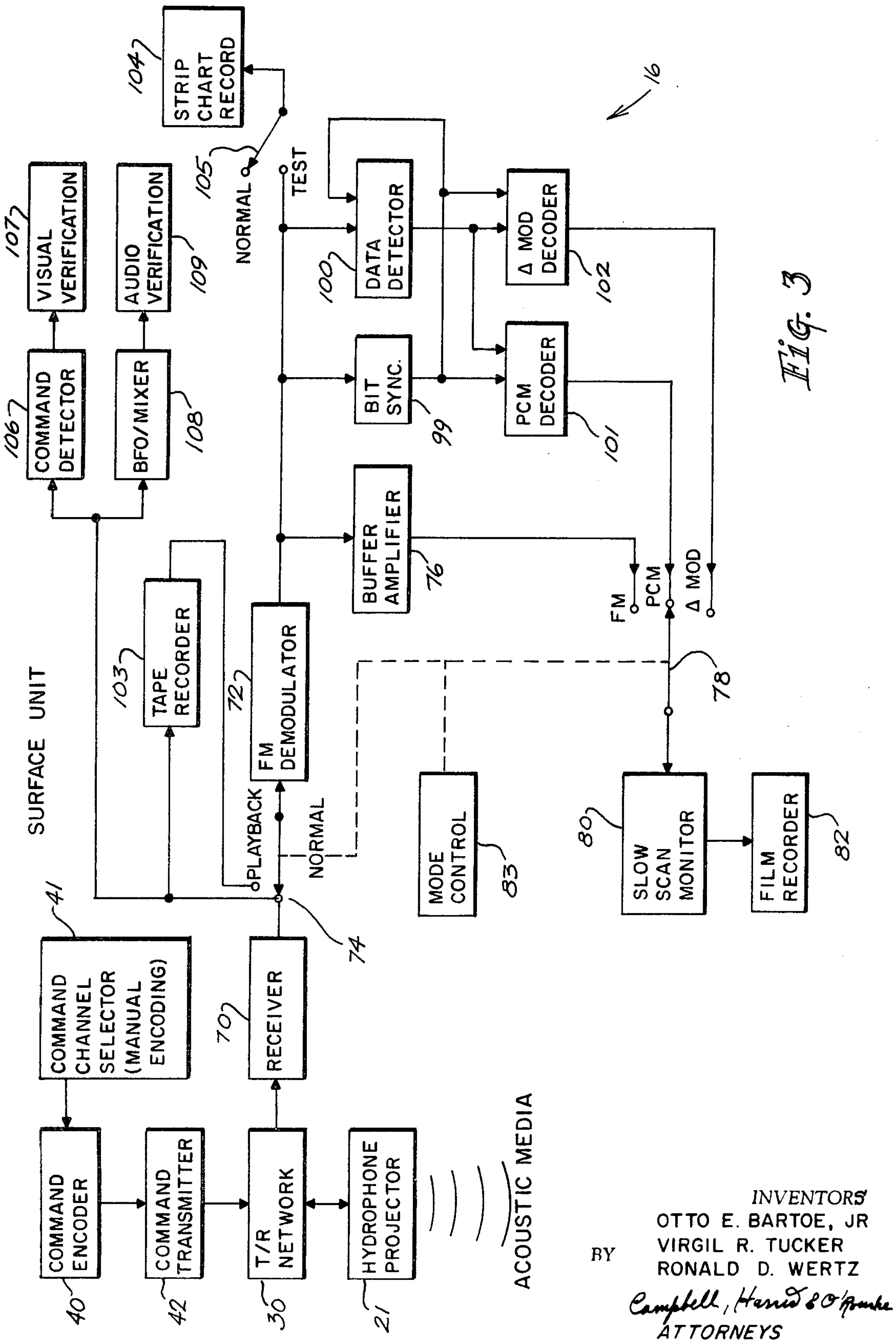
FIG. 3 is a block diagram presentation of the surface unit in greater detail than shown in FIG. 2.

As shown in greater detail in FIG. 3, a command encoder 40 is provided, the output of which is coupled through a command transmitter 42 (which preferably operates at a frequency of about 9.25 kHz) to the transmit-receive network 30. A command signal coupled through transmit-receive network 30 is coupled to conventional hydrophone-projector (an electro-acoustical transducer) 21 for acoustic transmission through the water medium.

Command encoder 40 can be, for example, a conventional multi-channel command tone generator having a conventional channel selector 41 connected therewith. A command tone generator is capable of producing a desired plurality of discrete command tones which are selectable by the command channel selector, as is well known in the art.

As indicated in FIG. 3, manual encoding may be effected by utilizing two channels, one tone channel representing a "1" and the second tone channel representing a "0". Thus, a binary coded signal can be transmitted, as desired. While not shown, it would, of course, be possible to provide a binary code unit to develop a binary coded signal for transmission in addition to or in lieu of, the manual system as set forth.

Figure 4:
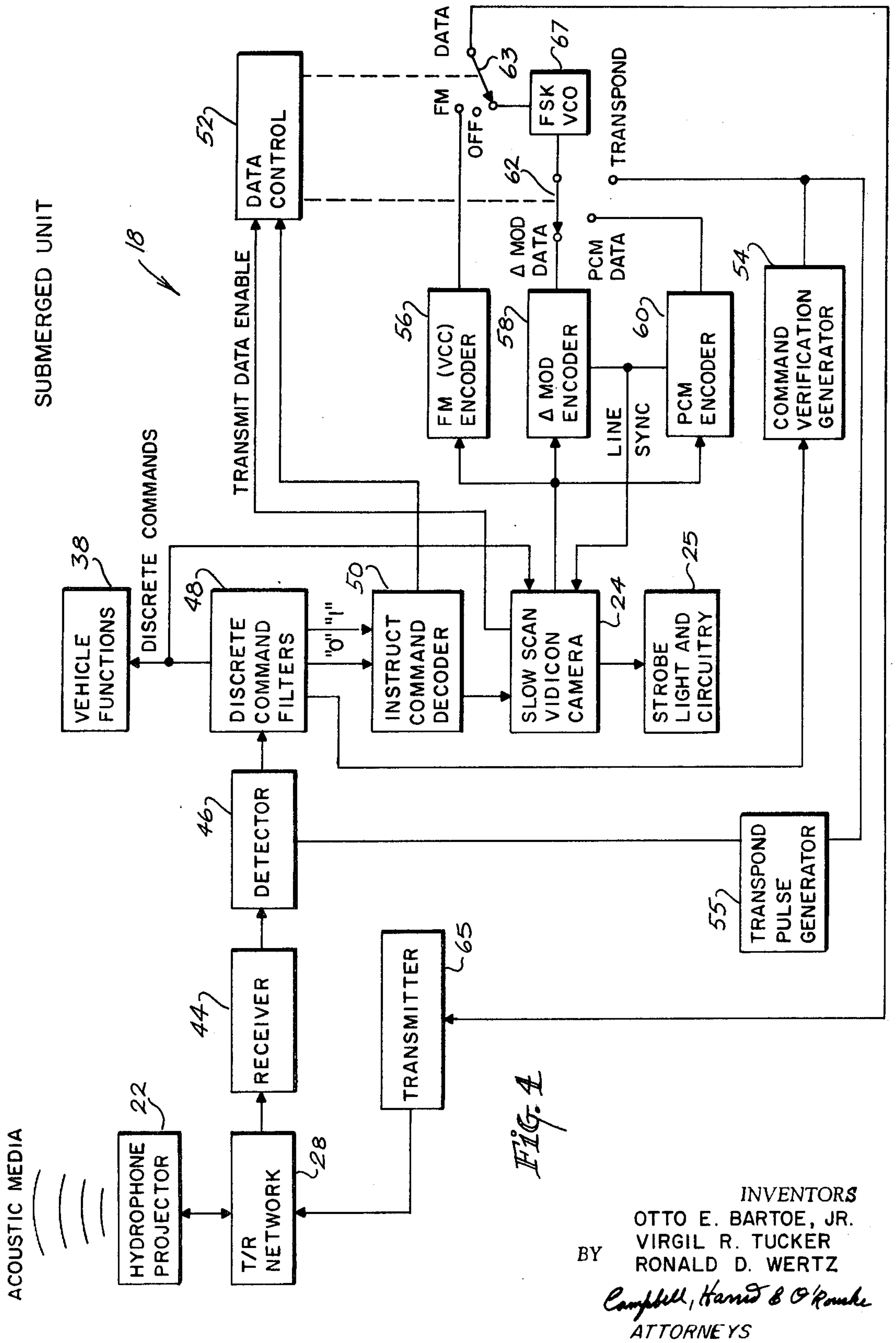
FIG. 4 is a block diagram presentation of the submerged unit shown in greater detail than shown in FIG. 2.

As shown in FIG. 4, the acoustic energy from projector 21 is received at the submerged unit 18 by conventional hydrophone-projector (an electro-acoustical transducer) 22, with the electrical energy produced being coupled through transmit-receive network 28 to conventional command receiver 44. The output from the command receiver is then coupled to a conventional detector 46, the output of which is coupled to conventional discrete command filters 48 for separating the commands. The separated commands are then coupled to the video camera unit 24 and to the various vehicle functions (identified by the block 38) for causing the desired command to be carried out, by means of relay closures, for example.

If a binary coded signal is utilized, as brought out hereinabove at surface command encoding unit 40, then the separated command tones carrying the coded information are coupled to instruct command decoder 50 after which the command is coupled to the video camera unit 24 to cause the command to be conventionally carried out, again by means of conventional relay closures, for example.

As also shown in FIG. 4, a command output (shown to be from the command decoder) is also coupled to data control unit 52 to control the mode utilized for transmission of video information to the surface unit 16 from submerged unit 18.

While the output from the command decoder 50 is shown to control data control unit 52 and not to control vehicle functions 38, it is to be realized that a tone command from the command filters 48 could be utilized to control data control 52, if desired, as could a decoded signal from command decoder 50 be utilized to control vehicle functions, if desired.

The outputs from the discrete command filters 48 are also coupled to a conventional command verification generator 54, an output pulse from which is transmitted back to the surface whenever there is an output through any one of the filters or discrete command filters 48. In addition, a transpond command signal (which can be part of the command signal to control the submerged unit) from the surface unit is utilized to trigger transpond pulse generator 55, which causes output pulses to be transmitted back to the surface.

As also shown in FIG. 4, the slow scan readout from video camera unit 24 is coupled to three encoders — frequency modulation (FM) encoder 56, delta modulation (Δ MOD) encoder 58, and pulse code modulation (PCM) encoder 60 — which enables the unit to operate in any one of three modes (as well as in the transpond mode for command verification and transponspond pulse transmission). The mode is selected by conventional switching, indicated by switches 62 and 63 controlled by data control unit 52 (and thus are surface controlled). Submerged unit 18 remains normally in the transpond mode until a digital data mode or FM mode operation is commanded through data control 52.

As shown for the FM mode, the output from the FM encoder (which can be a voltage controlled oscillator)

is coupled through switch 63 directly to transmitter 65, which preferably operates at a center frequency of about 14.5 kHz and which provides the output to hydrophone-projector 22 through transmit-receive switch 28.

Utilizing the delta modulation mode, switches 62 and 63 are moved to the position as shown in FIG. 4 so that the output from the delta modulation encoder 58 is coupled through a conventional frequency shift keying (FSK) voltage controlled oscillator (VCO) 67 to transmitter 65 (as is the output from command verification generator 54 and transpond pulse generator 55).

In like manner, for the PCM mode, the output from the PCM encoder 60 is likewise coupled through FSK VCO 67 to transmitter 65. In addition, a line synchronization output is taken from the delta modulation encoder 58 and the PCM modulation encoder 60 and coupled to the slow scan video camera unit 24 for synchronization purposes.

As shown in FIG. 3, the surface unit 16 has the capability of receiving in three operational modes. The incoming acoustic energy is received at hydrophone-projector 21 and the resulting electrical signals are coupled through transmit-receive network 30, conventional receiver 70 and switch 74 to conventional FM demodulator 72. The demodulated output signals are then coupled, for the FM mode, through buffer amplifier 76 and switch 78 to a slow scan monitor 80, which may have a conventional film recoder 82, such as a camera, associated therewith to record the video line-by-line for hard copy readout. A mode control unit 83 is also provided to control switches 74 and 78 in conventional manner (the switches while indicated by standard switch indications, could, of course, be solid state switches, if desired, as preferably are switches 62 and 63 used in the submerged unit).

Figure 5:
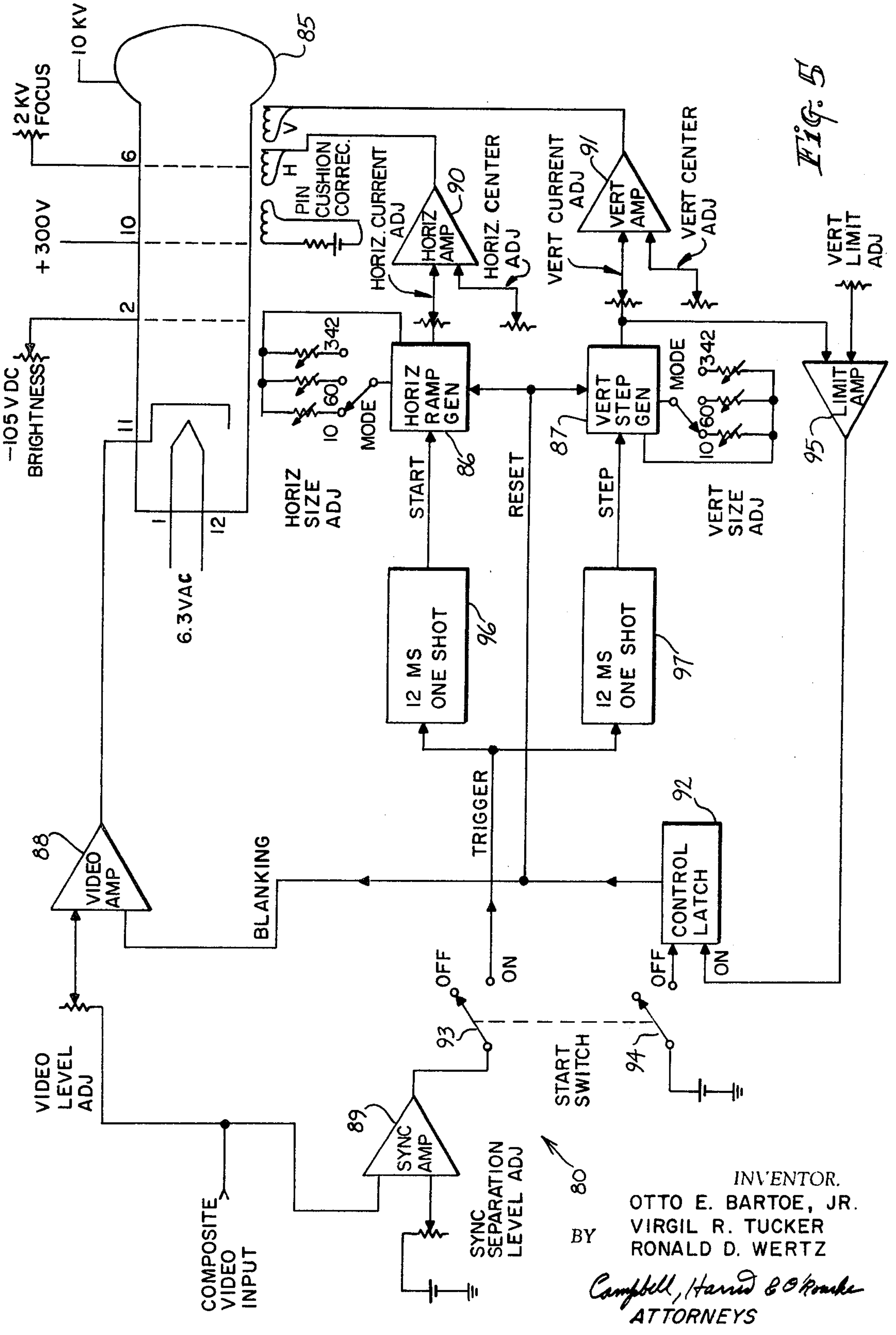
FIG. 5 is a block diagram presentation of the slow scan monitor shown in block form in FIG. 3.

As shown in detail in FIG. 5, the slow scan television monitor 80 contains a raster that is slaved to the synchronized pedestal which is contained within the composite video signal. The electron beam of conventional cathode ray tube 85 is intensity modulated by the decoded video signal while the horizontal and vertical sweep generators 86 and 87, respectively, serve to establish the single-frame raster.

Thus, the decoded compositive video signal is used to supply electron beam brightness information to the cathode of the cathode ray tube through video amplifier 88 and to supply line synchronization for the screen raster through sync amplifier 89. Deflection of the beam is accomplished in a conventional manner by the current supplied from the horizontal and vertical amplifiers 90 and 91, respectively. Each of these amplifiers obtains two inputs - a centering current that is manually adjustable and a deflection current supplied by conventional horizontal and vertical generators 86 and 87, respectively. Prior to display of a slow scan scene, the horizontal and vertical size must be selected manually, in the illustrated embodiment, to provide the proper step size for vertical and ramp rate for horizontal drive.

Both of these generators are reset by the control latch 92 which receives inputs from the frame start switch 93–94 and the vertical limit amplifier 95. The vertical limit amplifier supplies a signal to the control latch, which essentially is a flip-flop. This vertical limit indicates completion of the raster and the subsequent control latch is used to blank the display tube until the next frame is commanded.

Each of the sweep generators receives step or start commands from 12-millisecond one-shot multivibrators 96 and 97. These one-shot multivibrators are triggered by the synchronization signal in the received composite video. The synchronization pulse is larger in amplitude than any video level and is thus separable by the synchronization amplifier.

In the other two operational modes, the output from the FM demodulator 72 is coupled to a conventional bit synchronizer 99 and conventional data detector 100. The outputs from bit synchronizer 99 and data detector 100 are coupled to PCM decoder 101 and delta modulation decoder 102 which are selectively connected with the slow scan monitor 80 through switch 78.

As also shown in FIG. 3, the output from receiver 70 is normally coupled to tape recorder 103, which, if caused to be operating, will continually record the information for later play back. Playback of the recorded information requires that switch 74 be moved from the record (normal) position (as shown in FIG. 3) to the play back position. The output from FM demodulator 72 can also be coupled to a conventional strip chart record unit 104, if desired, by closing switch 105.

As also shown in FIG. 3, the received verification and transpond signals are taken from receiver 70 and coupled through command detector unit 106 to a visual verification unit 107 and through a beat frequency oscillator (BFO)/mixer 108 to an audio verification 109.

Figure 6:
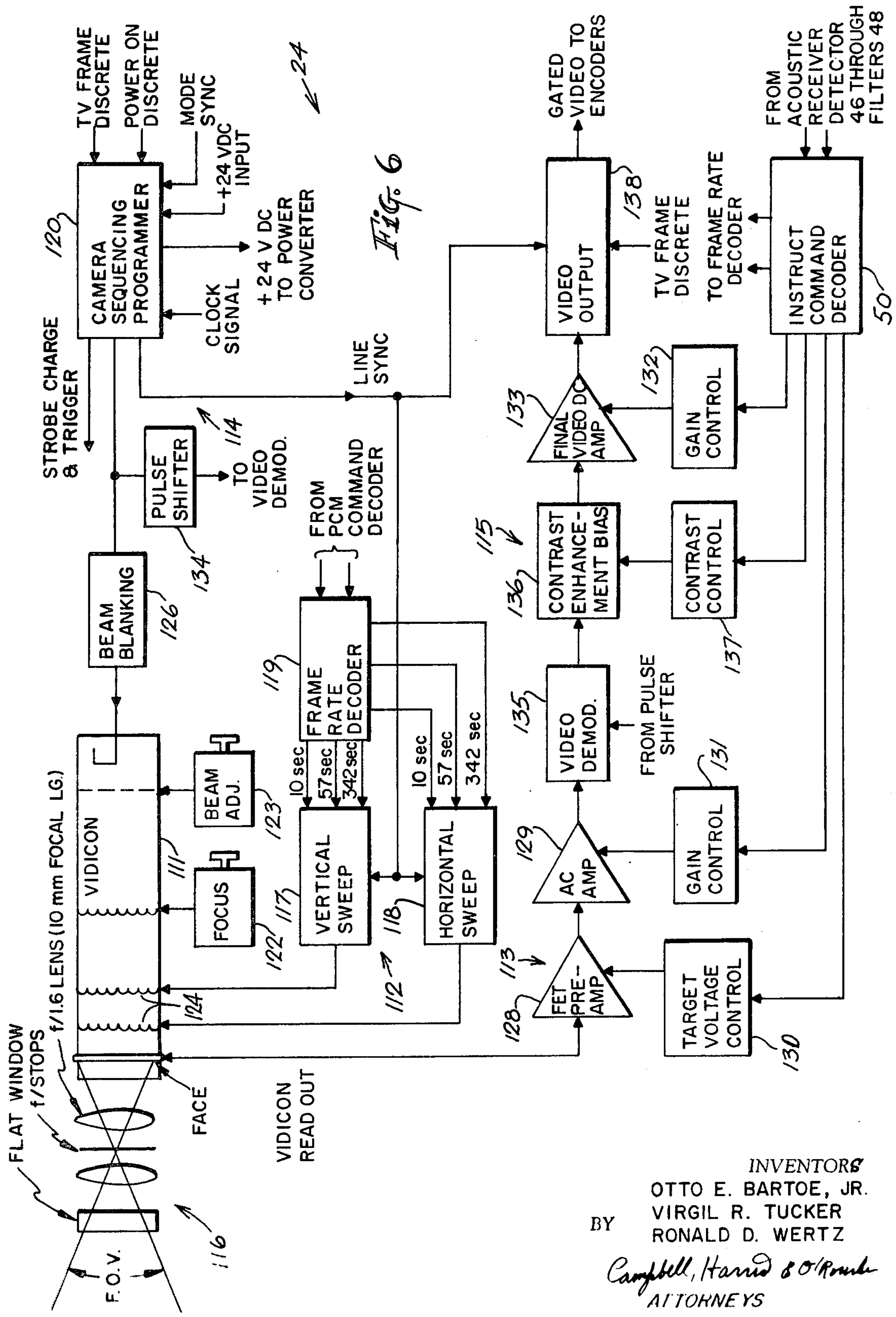
FIG. 6 is a block diagram presentation of the slow scan vidicon camera shown in block form in FIGS. 2 and 4.

A functional block diagram of the slow scan video camera unit 24 (including, for illustration PCM instruction command decoder unit 50) is illustrated in FIG. 6. Essentially the vidicon camera unit 24 includes a long persistence vidicon tube 111 (preferably of 1 inch diameter), beam and sweep circuits 112 for raster and intensity drive, a video amplifier 113, sequencing and synchronization circuits 114, decoders and controls 115 for remote adjustment of a transmitted picture, and a lens system 116 to provide a range of *f* stops and focus of the scene on the sensitive tube face.

A small vidicon tube 111 was chosen because of small size and ability to operate over a broad range of light intensity while still being relatively simple and rugged. Other types of TV camera tubes could be adapted to use for slow scan television, however, and this invention is not meant to be restricted to the vidicon tube specifically shown and described herein.

Beam and sweep circuits 112 include vertical sweep unit 117 and horizontal sweep unit 118, both of which are described more fully hereinafter. Sweep units 117 and 118 are connected to receive outputs from frame time control unit 119, which, in turn, receives an output from instruct-command decoder 50 (which is shown in both FIGS. 4 and 6 and in more detail in FIG. 8). In addition, both the horizontal and vertical sweep circuits receive an output from the camera sequencing programmer 120 (which is described in more detail in FIG. 7). In addition, a manual focus unit 122 and a manual beam adjust unit 123 are also connected with the vidicon tube 111. Beam and sweep circuits 112 are used to properly focus the electron gun so that the selected line resolution and rectangular raster is achieved. Three picture resolutions are available by remote command of the sweep circuits - 80, 200, and 500 lines. The deflection coils 124 are wound to drive the beam at the slow scan rate and require 10, 57, and 342 seconds for a single frame, respectively, the frame rate is selected by command from the PCM command decoder through frame rate decoder unit 119.

The vidicon beam is controlled by the blanking pulse to the vidicon tube 111 from beam blanking circuit 126, which unit receives an output from camera sequencer 120. Each time the horizontal sweep circuit moves, the beam is unblanked to achieve an AC signal at the target.

Multi-stage video amplifier 113 (which receives the vidicon readout from the face of the vidicon tube) includes a high input impedance FET preamplifier 128 and an AC amplifier 129. This circuit must function at extremely low target current due to the long readout time. A command code from instruct command decoder 50 is coupled to target voltage control 130 to alter the DC target voltage supplied by FET preamplifier 128. Adjustment of the target voltage acts in a somewhat similar manner as the lens diaphragm. A combination of target voltage and video amplifier gain allows a gain range of 10,000 to 1 without changing the diaphragm stop.

Gain of the video AC amplifier 129 is controlled through the instruct command decoder unit 50 and, more particularly, by means of an output therefrom to gain control 131 to control the gain of amplifier 129. In like manner, gain control 132 receives an output from instruct command decoder 50 and controls the gain of final video DC amplifier 133.

A video demodulator 135 converts the amplified AC signal from AC amplifier 129 to a DC level. A second input is supplied to video demodulator 135 by an output from camera sequencer 120 through pulse shifter 134. The DC level output from video demodulator 135 is acted upon by the contrast enhancement bias circuit 136 to allow an effective spreading of picture contrast. Contrast enhancement will bring out the contrast of certain portions of the picture of interest while it may also allow the remainder of the scene to become all white or all black. Contrast enhancement bias unit 136 is controlled by contrast control 137 which receives an output from instruct command decoder 50.

The output from contrast enhancement bias circuit 136 is then coupled through final video DC amplifier 133 and video output circuit 138 to provide the video to the encoders as shown in FIG. 4.

Figure 7:
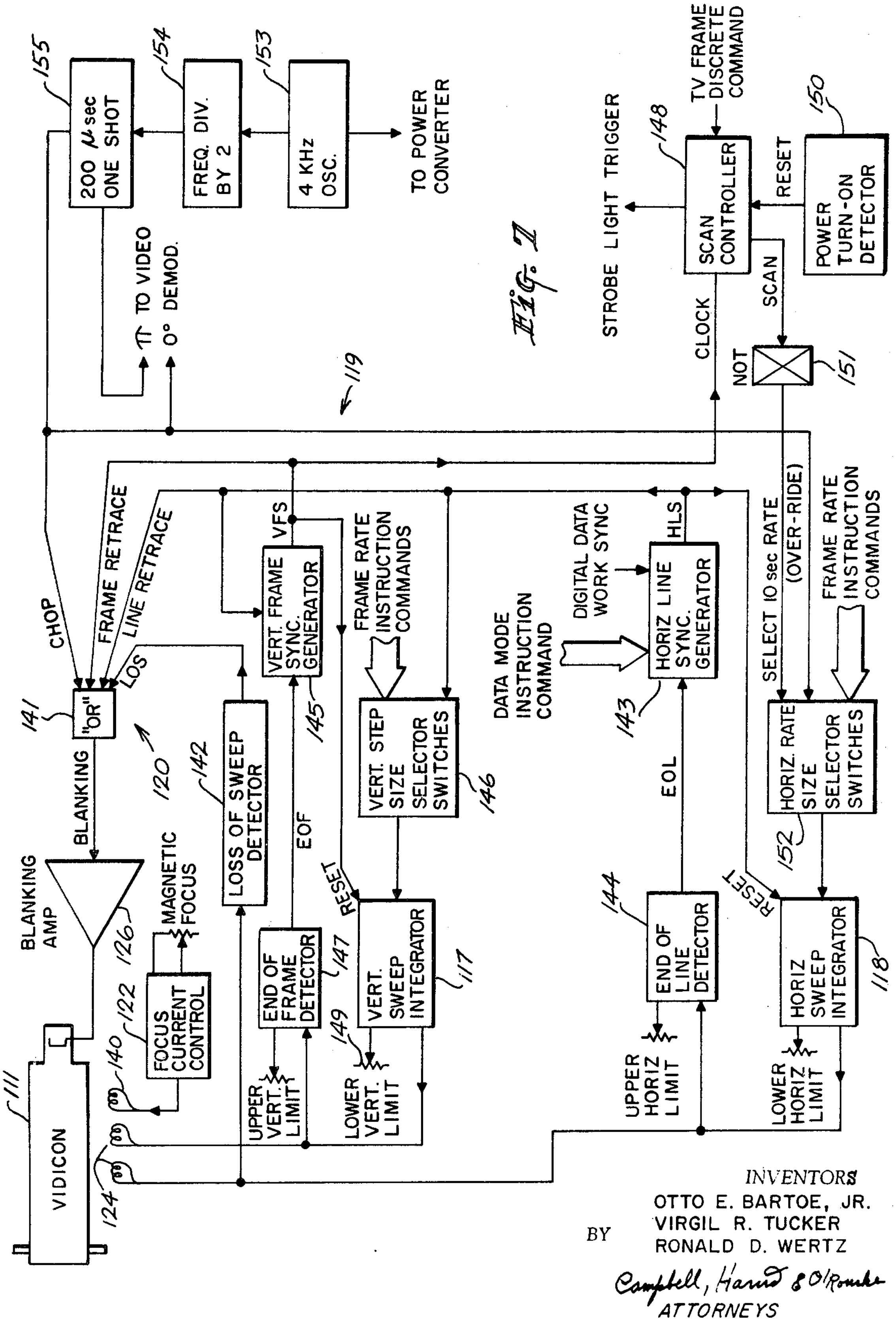
FIG. 7 is a block diagram presentation in greater detail of the camera sequencer beam blanking, frame rate decoder, vertical sweep, and horizontal sweep as shown in FIG. 6.

Camera sequencing program circuit 120 is provided to synchronize the horizontal and vertical sweep generators, beam blanking, and fire the strobe flash, as well as to control the vidicon erase cycle and operate the video demodulator. FIG. 7 illustrates in more detail the camera control and sequencing functions of FIG. 6. The control functions of focus and beam sweep are established by current drivers connected to appropriate magnetic deflection coils. As shown, focus current control 122 controls magnetic deflection coil 140 for control of magnetic focus. The function of the vertical and horizontal sweep generators 117 and 118 is also shown in FIG. 7.

Camera sequencing is required to correlate beam blanking with beam drive. Beam blanking is effected by cathode bias through the blanking amplifier 126. Input to this amplifier is controlled by the blanking OR circuit 141 that has four inputs. The first input is loss of sweep that senses output of the horizontal sweep generator through a sweep loss detector 142. This is needed since loss of horizontal drive will inhibit vertical sweep and thus cause the beam to burn the tube face.

The second blanking OR input is derived from the horizontal line synchronization generator 143 which starts when the end of line detector 144 is activated (this detector also receives an input from the horizontal sweep integrator 118). The output from horizontal line synchronization generator 143 is automatically terminated after a 20 millisecond delay if the FM mode is active and a 48 digital bit period delay if a digital mode is active. The horizontal line synchronization generator 143 therefore controls blanking during line retrace. The output from generator 143 is also coupled to vertical frame sync generator 145, to vertical step size selector switch 146 to control vertical step generation and to horizontal sweep integrator 118 for reset.

The third input to the blanking OR 141 is frame retrace. This signal is generated at the end of raster by the vertical frame synchronization generator 145 (which receives an input from vertical sweep integrator 117 through the end of frame detector 147). The output of this vertical frame synchronization generator also clocks the scan controller 148 and resets the vertical sweep integrator 117. The setting of the lower vertical limit manual control 149 establishes the location of the bottom of the raster on the tube face.

The scan controller is used to command charging of the strobe light power supply and the subsequent flash as well as to establish a means for setting the horizontal sweep rate at the highest rate for vidicon erase. The vidicon is erased by scanning the exact number of lines required for the frame rate selected (10 seconds, 57 seconds, or 342 seconds) with each horizontal line scanned at the rate used for 10 second frames. This assures rapid erase of the tube face area to be used in the next picture. Scan controller 148 is reset by an output from power turn-on detector 150, which prevents start-up in a frame scan mode.

The strobe light cycle begins with receipt of the TV frame discrete command and the first vertical frame synchronization generator output. The readout scan of the vidicon face is initiated by the second vertical frame synchronization signal and lasts for one complete frame. The horizontal ten-second rate override is inhibited during this readout scan by the NOT circuit 151 (the output of which is coupled to horizontal rate selector switch 152), to provide a horizontal rate in accordance with the frame rate instruction command. The transmit data enable signal is supplied to data control 52, during both strobe light and readout cycles.

A 4 kHz oscillator 153 is coupled through a frequency divide-by-two unit 154 to key a 200 microsecond one-shot multivibrator 155 and also to excite a DC/DC power converter (not shown). Output of the 200 microsecond one-shot multivibrator controls the video demodulator 135, the horizontal rate selector 152 and the chop input to the blanking OR 141 as its fourth input. This chop signal is used to blank the beam between each horizontal step to produce an AC signal at the vidicon target.

Figure 8:
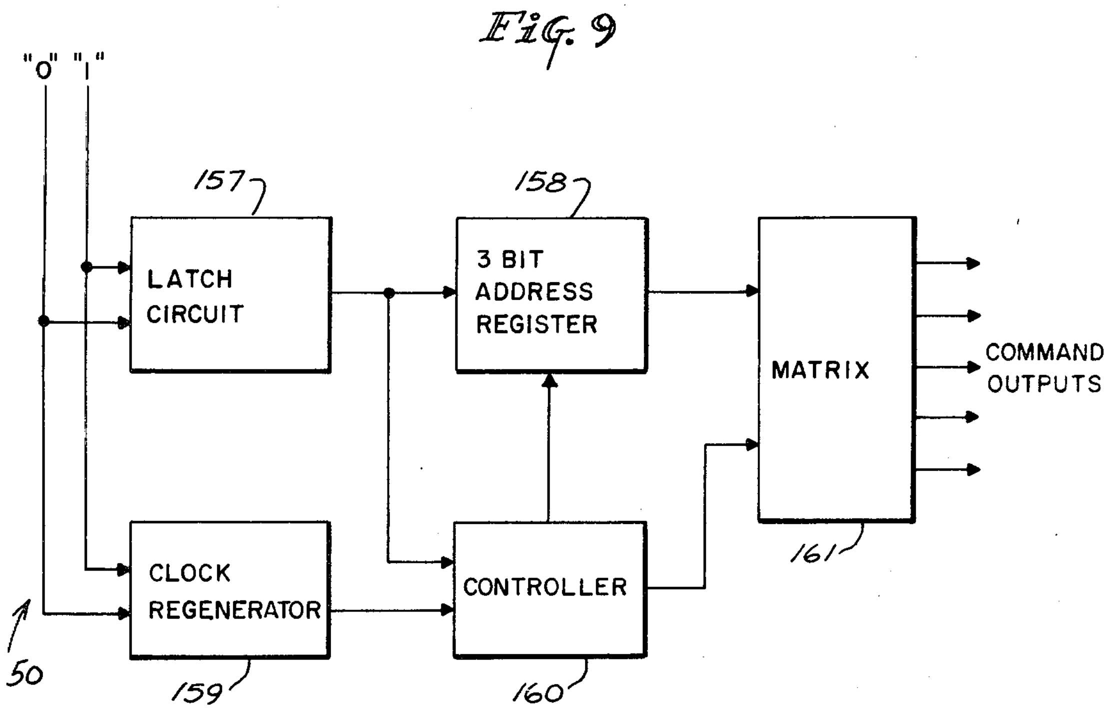
FIG. 8 is a block diagram presentation in greater detail of the instruct command decoder shown in block form in FIGS. 4 and 6.

The camera command decoder unit 50 senses the digital words received through two channels of the acoustic command system. One channel represents a binary "1" and a second channel a binary "0". As shown in FIG. 8, a latch circuit 157 responds to the "1's" and "0's" (ones and zeros) and supplies a three-bit code to a three-bit address register 158. The input to decoder unit 50 is also coupled to a clock regenerator 159. The outputs from the latch circuit and the clock regenerator are then coupled to a controller 160, the output of which is coupled to a matrix 161, as is the output from three-bit address register 158. The outputs from the matrix then are used to control the proper functions, as illustrated in FIG. 6.

The lens is an f/1.6 lens and is a C-mount type for 16 mm motion picture camera. A 10 mm focal length was chosen to give a wide angle view in water. However, the water-to-glass-to-air interface causes refraction of light and subsequent reduction of the field of view by about one-third. The short focal length lens gives a broad depth of field to eliminate the need for focus during use of the camera under water. Other types of lens and lens adapters could be used, if desired, however, to create telephoto, zoom, and very wide angle views. The *f* stop is manually set from f/1.6 to f/22 prior to use under water in the illustrated embodiment of the invention. Changes in video signal are then made with the target voltage, video gain adjustments, and contrast enhancement by the acoustic command system.

Figure 9:
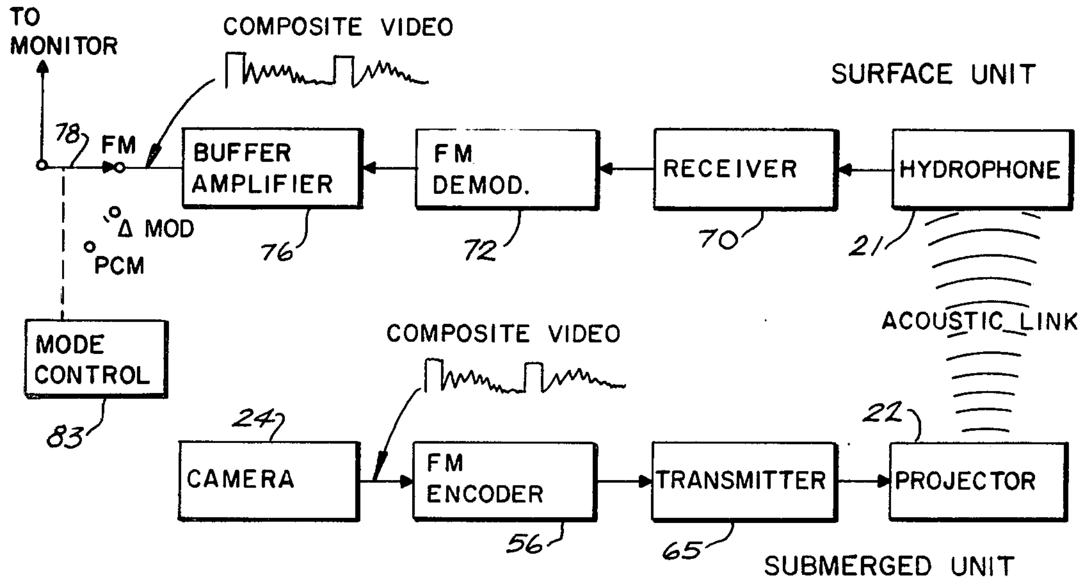
FIG. 9 is a block diagram presentation of the analog FM mode for video as shown in the block diagram of FIGS. 3 and 4.

A functional block diagram of the analog FM video operational mode is illustrated in FIG. 9. The output from the camera unit 24 is a composite video signal in analog format with synchronization signals included therein, and the signal is included within a bandwidth of 500 Hz.

The FM encoder 56 is a voltage controlled oscillator (VCO) and is used to frequency modulate the carrier of acoustic transmitter 65. The center frequency for this transmitter has been selected as 14.5 kHz to optimize the attenuation and ambient noise in the sea. (Spreading and absorption losses increase with frequency while ambient noise is reduced.)

A circular, flat acoustic transducer 22 is used to convert electrical signals to acoustic waves in the water, with the transducer having a radiation pattern at the 14.5 kHz frequency that has an approximate front-to-back ratio of 20 db. When operated near the sea floor, this reduces the sea floor echo signal when the transducer is installed to transmit upwardly. A similar radiation pattern exists from the transducer 21 used with the ship-borne equipment. During operation, the ship will be located as nearly above the underwater unit as possible to allow reception of the strongest signal level and minimize echo signals.

The ship-borne hydrophone 21 is lowered into the water from 50 to 100 feet to minimize surface reflection and noise effects. The received signals are filtered and amplified in the receiver 70, and video data is detected by an FM discriminator detector (demodulator) 72 that has a bandpass of 3 kHz. A buffer amplifier 76 is used in this mode to couple the detected composite video to the monitor.

Figure 10:
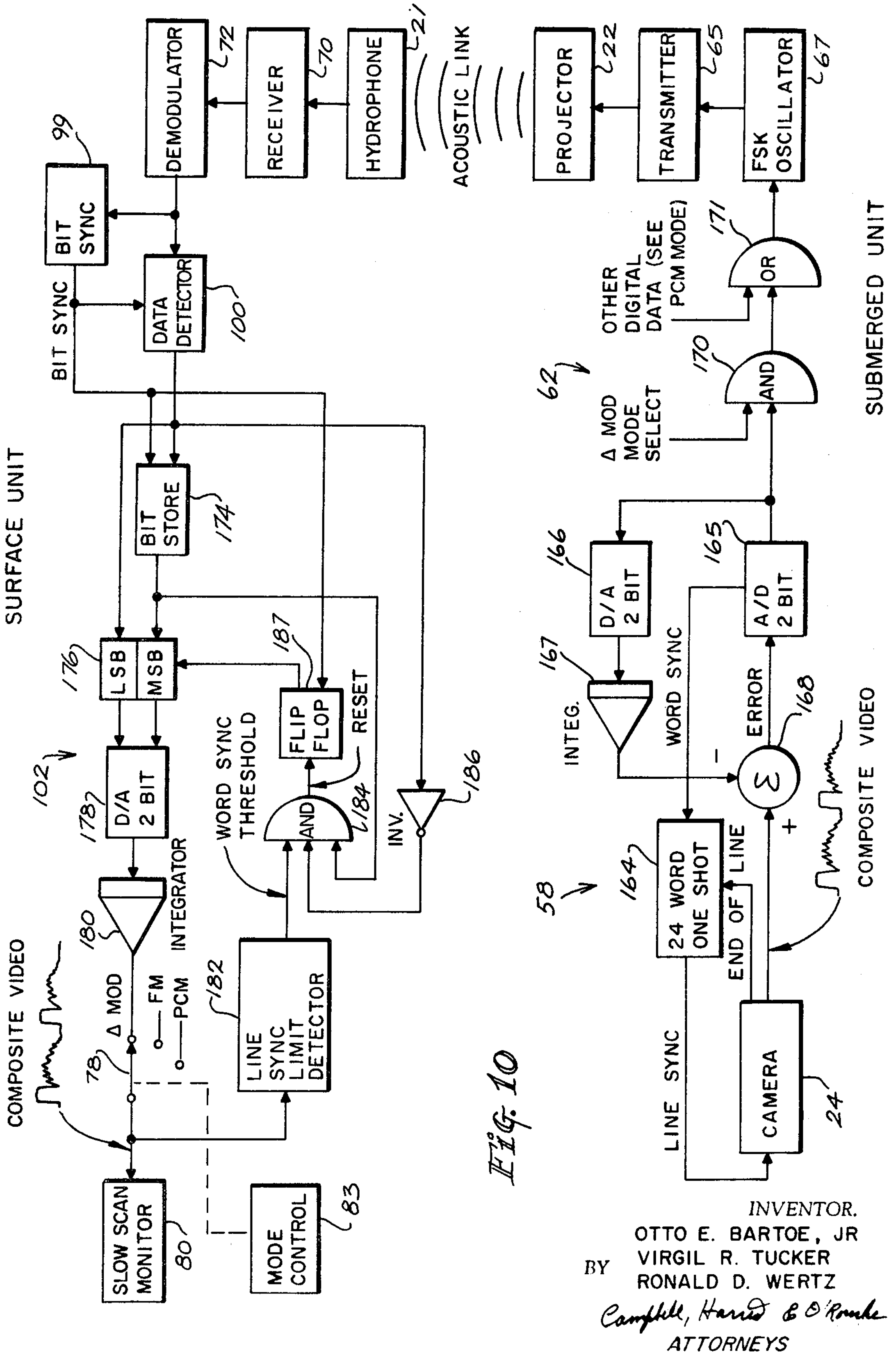
FIG. 10 is a block diagram presentation of the delta modulation mode for video in greater detail than as shown in FIGS. 3 and 4.

A functional block diagram of the delta modulation digital operational mode is illustrated in FIG. 10. The acoustic transmitter 65, receiver 70, and projector-hydrophone transducers 21 and 22 function as described with respect to the FM mode except that the transmitted energy is in the form of fixed frequency pulses. A frequency shift keying (FSK) circuit 67 of conventional design is used to establish one frequency for binary "0" and another frequency for binary "1".

A frequency of 14.5 kHz has been utilized as the center frequency with 13.5 kHz and 15.5 kHz being utilized, respectively, for the "0's" and "1's" (zeros and ones). The FSK technique preferably employed utilizes nonreturn-to-zero (NRZ) coding with frequency shift as the waveform passes through zero. This causes transducer frequency change in less than one cycle. A filter bandwidth of 3,000 Hz is used in the receiver demodulator 72. This bandwidth is sufficient to pass 2,500 bits per second with the NRZ coding used. The delta modulation mode, as described with respect to FIG. 10, operates at a fixed information rate of 2,500 bits per second. Each data word in the delta scheme contains two binary bits so that 1,250 samples per second can be realized. Sampled data theory suggests that two or more samples per cycle be used. A 2.5 figure was selected resulting in an analog video bandwidth of 500 Hz.

For a 500 line raster with an aspect ratio of 3:4, the horizontal scan time is 665 milliseconds. Thus, line scan requirement plus 20 milliseconds per line for synchronization and retrace results in a 342 second picture frame time. Frame times for 200 and 80 line pictures are 57 and 10 seconds, respectively.

Synchronization, retrace, and the start of each line is coordinated with the monitor by the pedestal in the composite video from camera 24, as indicated in the typical waveform shown in FIG. 10 which may appear at the output of the camera and is then reproduced in the surface unit at the monitor input, as also indicated in FIG. 10.

A one-shot multivibrator 164 (which is part of delta modulator encoder 58) that holds for 24 word times is initiated by a threshold detector in the horizontal beam sweep circuit of the camera 24 (indicated by the end of line input to multivibrator 164 from camera 24 in FIG. 10). The 24 word counts are received at multivibrator 164 from two-bit analog-to digital (A/D) converter 165 (indicated in FIG. 10 as the word sync input).

Each line segment of the camera picture contains an analog voltage level that is a function of the light intensity received from that particular part of the scene. This video level is changed in a conventional manner to digital data by the A/D converter 165. A D/A converter 166 and integrator 167 are used as feedback elements to change the digital data back to analog and hold it during the word time for summation (at comparator 168) with the analog video signal. Therefore, the resulting analog error is converted to digital error for transmission to the monitor 80 of surface unit 16. This scheme functions as a brightness change modulator as the electron beam is stepped to each successive spot on the vidicon target. With only two binary bits utilized for information relative to brightness change, only four levels are available. These levels preferably chosen are +1, +3, −1, and −3, with the plus levels referring to brighter levels and the minus referring to dimmer levels. The system steps at least plus or minus one level, with the levels actually representing gray levels so that several words may be required if a black-to-white boundary is scanned. While this could add some blur at high contrast areas, this has not been found objectionable on pictures of 500 lines or less.

The output from the two-bit A/D converter 165 is coupled through switch unit 62, which as shown in FIG. 10, can include an AND gate 170 (to control the mode of operation by mode selection) and an OR gate 171 (to allow use of other digital modes, if desired). Thus, the switching unit 62 connects A/D converter 165 of delta encoder 58 with the FSK oscillator 67.

In the surface unit 16, the acoustic modulated carrier is received, amplified, and demodulated. Output of the demodulator 72 is a waveform at the 1,250 samples per second rate with positive amplitude being defined as a binary "1" and negative amplitude as a binary "0". This output is then coupled to data detector 100 which incorporates an integrator so that noise can be averaged over a full cycle. This provides a criteria for selection of a "1" or a "0". A bit storage unit 174 and two-bit buffer 176 are used to decode serial data so that the least significant bit (LSB) and the most significant bit (MSB) are properly identified. When the MSB is a "1" the spot brightness is to be increased, while a "0" MSB demands reduction of brightness. The amount of increase or decrease (one or three levels) is thus a function of the state of the LSB of two-bit buffer 176.

A D/A converter 178 receives the outputs from the two-bit buffer and is used to reproduce the analog equivalent voltage. This voltage is integrated by integrator 180 and supplied to the monitor 80 (when switching unit 78 is switched for delta modulation operation) as the reconstituted video signal.

The monitor input is also coupled to a line synchronization limit detector 182, the output of which is coupled to AND gate 184. AND gate 184 also receives two other inputs, one directly from bit storage unit 174 and the other from data detector 100 through inverter 186. Line synchronization is effected at the exact time that three conditions are satisfied at the input to the AND gate. The first condition is satisfied by the maximum available output of the integrator during the receipt of the video pedestal. This pedestal causes all binary "1's" to be supplied by the bit store unit 174. The second condition is satisfied by the last "1" that occurs before the pedestal drops to zero volts. This "1" exists on the output of the bit store unit long enough for the third condition to be satisfied. The third "1" will occur at the inverter output when its input is zero at bit synchronization time when the pedestal falls to the zero level.

The output from AND gate 184 is coupled to flip-flop 187, the output of which is coupled to the most significant bit (MSB) of two-bit buffer 176. A second input of the flip-flop 187 is from bit synchronizer 99.

Figure 11:
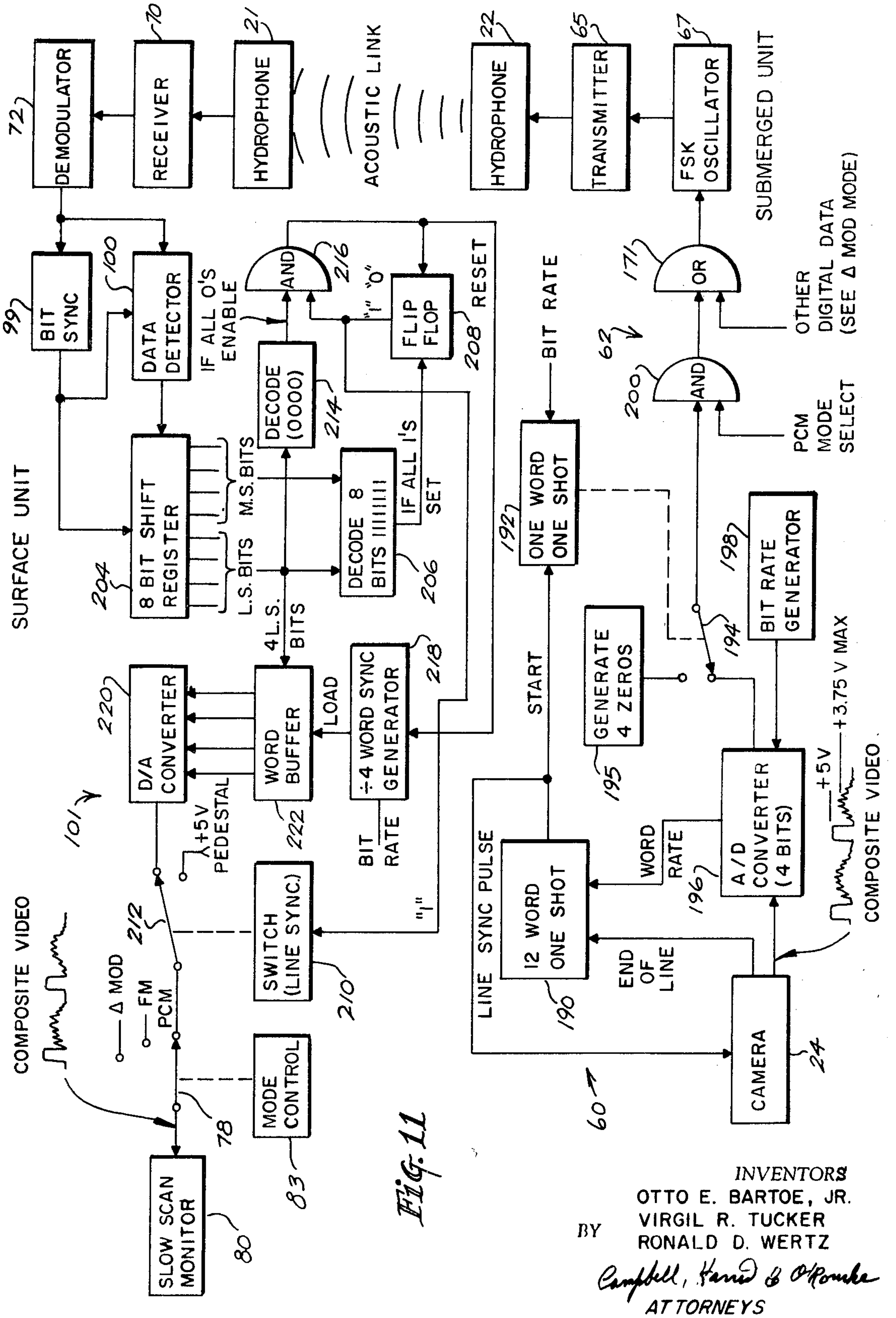
FIG. 11 is a block diagram presentation of the PCM mode for video in greater detail than as shown in FIGS. 3 and 4.

The PCM digital mode is illustrated in FIG. 11. After the video data from camera 24 is converted to digital coded form by PCM encoder 60, the transmission and reception is identical to that described in the delta modulation mode. PCM encoder 60 is operated at a bit rate of 2,500 bits/second. The PCM mode uses four-bit binary words to describe the video level. This encoding permits definition of gray scale of the target image to more than ten levels.

Operation of camera and coder synchronization is similar to that for the delta modulation mode. At the end of each line, the sweep threshold circuit in camera 24 activates and starts the 12-word one-shot multivibrator 190. This one-shot is enabled for 12 words during 2,500 bits/second operation. At the close of this pedestal period, the line synchronization pulse is generated and a one-word one-shot multivibrator 192 is triggered. One-word one-shot multivibrator 192 controls switch 194 to switch a four-zero generator 195 into the encoder output circuit to generate four binary zeros immediately after the frame synchronization pedestal drops to zero volts. These zeros are used to synchronize line sweep in the monitor as described hereinafter.

The video information from camera 24 is coupled to A/D converter (four bits) 196 of PCM encoder 60. Bit rate generator 198 supplies a second input to A/D converter 196, while one output from converter 196 is coupled to the twelve-word one-shot multivibrator 190 and a second output is coupled through switch 194 and AND gate 200 and OR gate 171 (of switch circuit 62) to FSK oscillator 67.

Operation of the A/D converter is conventional and is accomplished at the word rate of 625 per second.

Operation of the PCM decoder 101 is keyed to the synchronizing pedestal that is generated in the camera video system. A positive synchronization is achieved by sensing the pedestal as represented by a series of eight or more binary ones. The binary ones that occur during the pedestal saturation time are serially shifted from data detector 100 into eight-bit shift register 204. A decoder 206 senses the eight bits as a unique signal (larger than any video signal can become) and sets a flip-flop 208 to the one state. When flip-flop 208 is set to a one output, the line synchronization circuit 210 causes line synchronization switch 212 to be closed and the monitor pedestal is started. Flip-flop 208 remains set in the one state until the four zeros that follow the pedestal appear as the least significant bits in the shift register. A second decoder 214 senses the zeros and supplies the second enable to the AND gate 216 (which also receives the output of flip-flop 208). AND gate 216 resets flip-flop 208, starts a divide-by-four word synchronization generator 218, and causes the line synchronization switch to return to the data position (when flip-flop 208 resets), so that video data may be again applied to the monitor.

Video data is converted to an analog signal in D/A converter 220 as supplied by the four parallel lines from word buffer 222. Word buffer 222 receives the four LSB's from the eight-bit shift register 204 when the load signal is received from the divide-by-four word generator 218. Thus, the D/A converter 220 receives each word as a group of four bits. Synchronization of this circuit is established by the bit rate data as taken from the demodulator 72. Results of the pedestal generation and D/A conversion comprise the reconstituted composite video.

In operation, vessel 19 is submerged and can, if desired, be anchored to the ocean bottom as indicated in FIG. 1, or could be command-propelled as an alternative (not shown).

After vessel 19 is submerged, the underwater unit 18 is commanded through the command generator to perform the various functions necessary to view a scene. This is accomplished by activation of the strobe light after any remaining picture on the face of the tube is encased, as is conventional, after which the scene stored on the face of the vidicon tube is read out by the slow scan readout unit, the data then being coupled through the selected operational mode to the projector where it is converted to acoustic energy and transmitted. The transmitted acoustic energy is received by the hydrophone connected with the surface unit 16 and the energy reconverted to an electrical signal that is coupled through the receiver and processing circuitry to the TV monitor and, if desired, or necessary, to the film recorder. As can be seen, the camera scene is thus presented for viewing substantially immediately.

The underwater unit 18 is controlled to view successive scenes as desired, each view, of course, being retained long enough for readout, which can take, in some cases, as long as five minutes or as little as ten seconds, depending upon the resolution desired. After an area has been sufficiently viewed, the vehicle can then be moved to a new spot (if propelled) or brought back to the surface by release of the anchor (where anchored, as indicated in FIG. 1) to later be submerged in a new area.

As can be seen from the foregoing, this invention provides a heretofore unknown system well suited for viewing a camera scene under water in near real time by use of an acoustic link.

What is claimed is:

1. An acoustically linked television system, comprising: a video camera for recording a camera scene, said video camera including a vidicon tube having a camera sequencer for controlling beam chopping, vertical and horizontal sweep generators, and a frame time decoder for controlling the vertical and horizontal sweeps to produce a camera scene having a predetermined number of lines, said camera sequencer including a scan controller, an oscillator, a one-shot multivibrator receiving the output from said oscillator, and an OR gate connected to receive the output from said one-shot multivibrator and supplying an output to said blanking circuit, and wherein said frame time decoder includes horizontal and vertical selector switches for selecting one of a plurality of lines of a camera scene, signal processing means connected to receive the output from said vidicon tube and provide a gated video output, and vidicon tube control means for controlling sweep, said control means including a blanking circuit for chopping the input to said vidicon tube to disrupt the vidicon beam in a predetermined pattern; slow scan camera readout means for producing video data indicative of said camera scene at a predetermined rate less than real time; modulating means for receiving said video data from said slow scan readout means and producing modulated output signals; first transducer means connected with said modulating means for converting said modulated output signals into acoustic energy and transmitting the same; second transducer means for receiving said transmitted acoustic energy and substantially reconverting the same to said modulated output signals; demodulating means for receiving said modulated output signals from said second transducer means and substantially reproducing said video data therefrom; and utilization means for receiving said video data and substantially reproducing said camera scene.

2. An acoustically linked television system, comprising: a video camera for recording a camera scene; slow scan camera readout means for producing video data indicative of said camera scene at a predetermined rate less than real time; modulating means for receiving said video data from said slow scan readout means and producing modulated output signals, said modulating means including a comparator receiving the output from said video camera, an analog-to-digital two-bit converter connected to receive the error output from said comparator and provide an output to said first transducer means, a twenty-four word one-shot multivibrator receiving an output from said analog-to-digital converter and providing line synchronization to said video camera, a digital-to-analog two-bit converter connected to receive an output from said analog-to-digital two-bit converter, and an integrator connected to receive the output from said digital-to-analog two-bit converter and providing a second input to said comparator; first transducer means connected with said modulating means for converting said modulated output signals into acoustic energy and transmitting the same; second transducer means for receiving said transmitted acoustic energy and substantially reconverting the same to said modulated output signals; demodulating means for receiving said modulated output signals from said second transducer means and substantially reproducing said video data therefrom; and utilization means for receiving said video data and substantially reproducing said camera scene.

3. An acoustically linked television system, comprising: a video camera for recording a camera scene; slow scan camera readout means for producing video data indicative of said camera scene at a predetermined rate less than real time; modulating means for receiving said video data from said slow scan readout means and producing modulated output signals; first transducer means connected with said modulating means for converting said modulated output signals into acoustic energy and transmitting the same; second transducer means for receiving said transmitted acoustic energy and substantially reconverting the same to said modulated output signals; demodulating means for receiving said modulated output signals from said second transducer means and substantially reproducing said video data therefrom, said demodulating means including a data detector receiving a demodulated output from said second transducer means; a bit synchronizer connected to receive said demodulated output from said second transducer means and provide an input to said data detector; a bit storage unit receiving the output from said data detector and said bit synchronizer, a two-bit buffer having a most significant bit section receiving the output from said bit storage unit and a least significant bit section receiving the output from said data detector, a digital-to-analog two-bit converter receiving the output from said two-bit buffer, an integrator receiving the output from said digital-to-analog two-bit converter and providing an output to said utilization means, a line synchronization limit detector connected to receive the output from said integrator, an AND gate connected to receive the outputs from said line synchronization limit detector; an inverted output from said data detector, and the output from said bit storage unit, and a flip-flop connected to receive the outputs from said AND gate and said bit synchronizer and providing an output to said most significant bit section of said two-bit buffer; and utilization means for receiving said video data and substantially reproducing said camera scene.

4. An acoustically linked television system, comprising: a video camera for recording a camera scene; slow scan camera readout means for producing video data indicative of said camera scene at a predetermined rate less than real time; modulating means for receiving said video data from said slow scan readout means and producing modulated output signals, said modulating means including a four-bit analog-to-digital converter for receiving the output from said video camera, a bit rate generator the output of which is coupled to said analog-to-digital converter, a twelve-word one-shot multivibrator receiving the output from said analog-to-digital converter and an output from said video camera and providing an output pulse to said video camera for line synchronization, a one-word one-shot multivibrator receiving a start pulse from said twelve-word one-shot multivibrator, a four-zero generator, an FSK oscillator the output of which is connected with said second transducer means, a switch connecting said FSK oscillator with said four-zero generator when in one position and with said analog-to-digital converter when in the other position, the position of said switch being controlled by said one-word one-shot multivibrator; first transducer means connected with said modulating means for converting said modulated output signals into acoustic energy and transmitting the same; second transducer means for receiving said transmitted acoustic energy and substantially reconverting the same to said modulated output signals; demodulating means for receiving said modulated output signals from said second transducer means and substantially reproducing said video data therefrom; and utilization means for receiving said video data and substantially reproducing said camera scene.

5. An acoustically linked television system, comprising: a video camera for recording a camera scene; slow scan camera readout means for producing video data indicative of said camera scene at a predetermined rate less than real time; modulating means for receiving said video data from said slow scan readout means and producing modulated output signals; first transducer means connected with said modulating means for converting said modulated output signals into acoustic energy and transmitting the same; second transducer means for receiving said transmitted acoustic energy and substantially reconverting the same to said modulated output signals; demodulating means for receiving said modulated output signals from said second transducer means and substantially reproducing said video data therefrom, said demodulating means including a data detector receiving a demodulated output from said second transducer means, a bit synchronizer receiving a demodulated output from said second transducer means and providing an output to said data detector, an eight-bit shift register receiving the output from said data detector and said bit synchronizer, an eight-bit decoder for receiving the output from said eight-bit shift register and providing an output if all bits are ones, a flip-flop receiving the output from said eight-bit decoder, an AND gate connected to receive an output from said flip-flop, a four-zero decoder connected to the least most significant bit section of said eight-bit shift register and providing an output to said AND gate, said AND gate providing an output to said flip-flop, a word sync generator receiving a reset output from said AND gate, a word buffer receiving outputs from the least most significant section of said eight-bit shift register and said word sync generator, a digital-to-analog converter receiving the outputs from said word buffer, a switch connecting said digital-to-analog converter with said utilization means in one position, and a switch control receiving an output from said flip-flop to thereby control the position of said switch; and utilization means for receiving said video data and substantially reproducing said camera scene.

6. An acoustically linked television system, comprising: a video camera for recording a camera scene and producing video data indicative thereof; control signal generating means for generating control signals; control means receiving said control signals for controlling operation of said video camera in response to said received control signals, said control means including a command receiver and command decoding means having a detector, discrete command filters, and a command decoder, said command decoder including a latch circuit receiving a binary coded signal, a clock regenerator receiving said binary coded signal, a three-bit address circuit receiving the output from said latch circuit, a controller receiving the outputs from said latch circuit and said clock regenerator, and a matrix receiving the outputs from said three-bit address circuit and said controller and providing decoded output signals therefrom; modulating means for receiving said video data from said video camera and producing modulated output signals therefrom; demodulating means for substantially reproducing said video data from received modulated output signals; utilization means for receiving said reproduced video data and substantially reconstructing said camera scene therefrom; and acoustic linking means connected with said modulating means, control signal generating means, control means and demodulating means for receiving said modulated output signals and said control signals, converting said signals to acoustic energy for transmission, and reconverting said energy to substantially reproduce said signals after transmission.

7. An acoustically linked television system, comprising: a video camera for recording a camera scene and producing video data indicative thereof; control signal generating means for generating control signals; control means receiving said control signals for controlling operation of said video camera in response to said received control signals; modulating means for receiving said video data from said video camera and producing modulated output signals therefrom; demodulating means for substantially reproducing said video data from received modulated output signals; utilization means for receiving said reproduced video data and substantially reconstructing said camera scene therefrom; acoustic linking means connected with said modulating means, control signal generating means, control means and demodulating means for receiving said modulated output signals and said control signals, converting said signals to acoustic energy for transmission, and reconverting said energy to substantially reproduce said signals after transmission; and first command verification means to produce a verification signal indicative of command receipt by said control means, and second command verification means connected with said acoustic linking means to receive said verification signal therefrom and producing an output signal for coupling to said utilization means.

8. An acoustically linked television system, comprising: a video camera for recording a camera scene; slow scan readout means for producing video data signals at a predetermined rate that is indicative of said camera scene; video data modulating means for receiving said video data signals and producing video data modulated output signals therefrom; command encoding means for producing encoded command signals; command transmitter means connected with said command encoding means for transmitting said encoded signals; command decoding means for receiving and decoding said encoded command signals; control means for receiving said decoded command signals and responsive thereto for controlling operation of said video camera, said slow scan readout means, and said video data modulating means; video data demodulating means for demodulating received video data modulated output signals; display means for substantially reconstructing a camera scene from said demodulated video data signals; acoustic linking means for receiving said video data modulated signals and said command modulated signals and converting said signals to acoustic energy for transmission, said acoustic energy being reconverted after transmission to substantially reproduce said input signals coupled to said linking means; and command verification means linked by said linking means whereby verification of receipt of said command signals is obtained.

9. An acoustically linked television system for viewing an underwater camera scene, said system comprising: an underwater unit including a video camera for recording a camera scene, lighting means for lighting said camera scene, slow scan readout means for producing video data at a predetermined rate with said data being indicative of said camera scene, video data processing means for receiving said video data from said slow scan readout means and producing video data output signals, and control means for controlling operation of said underwater unit; a surface unit including command means for producing command signals, video data processing means for receiving video data after transmission, and display means for substantially reproducing a camera scene from received video data processed by said surface unit video data processing means; and acoustic linking means having a first section connected with said underwater unit and a second section connected with said surface unit whereby command signals are converted to acoustic energy at said first section and transmitted through the water to said second section where said signals are reconverted from acoustic energy to said command signals to control said control means in said underwater unit, and whereby said video data signals are converted to acoustic energy at said second section and transmitted through the water to said first section where said signals are reconverted from acoustic energy to video data signals which are processed to produce said camera scene at said display means.

10. The system of claim 9 wherein said video data processing means in said underwater unit includes modulating means for producing a modulated output signal, and wherein said data processing means in said surface unit includes demodulating means for demodulating received signals modulated in said underwater unit.

11. The system of claim 10 wherein said modulating means includes a voltage controlled oscillator, a delta modulator, and a PCM modulator, and wherein said demodulating means includes an FM demodulator, a delta modulation decoder, and a pulse code modulation decoder.

12. An acoustically linked television system for viewing an underwater camera scene, said system comprising: a video camera for recording a camera scene; strobe lighting means for lighting said camera scene; slow scan readout means for producing a predetermined rate video data output that is indicative of said camera scene; FM data mode signal processing means including a voltage controlled oscillator; delta mode signal processing means including a delta modulation encoder; PCM mode signal processing means including a pulse code modulation encoder; a frequency shift keying voltage controlled oscillator; first switch means for selecting one of said signal processing modes and connecting said frequency shift keying voltage controlled oscillator with said delta modulation encoder and said pulse code modulation encoder when selected; a data transmitter connected with the signal processing mode selected; a first transmit-receive switch connected to said data transmitter; a command receiver connected with said first transmit-receive switch; a detector connected to said command receiver; a command decoder means connected with said detector; means for connecting said command decoder means with said video camera to control operation of the same; a first hydrophone and projector connected with said first transmit-receive switch for converting video data signals from said data transmitter into acoustic energy and transmitting said acoustic energy through the water, and for receiving acoustic energy indicative of camera signals transmitted through the water and converting the same into said command signals to be coupled through said transmit-receive switch to said command receiver; a video data receiver; an FM demodulator connected with said video data receiver; an FM mode receiving channel including a buffer amplifier; delta modulation and PCM modulation receiving channels including a data detector, bit synchronization means, a delta modulation decoder and pulse code modulation decoder; second switching means for selecting one of said receiving channels; a TV monitor connected with said second switching means; a film recorder connected with said TV monitor; a command signal encoder; a command transmitter connected with said command signal encoder; a second transmit-receive switch connected with said command transmitter and said video data receiver; and a second hydrophone and projector connected with said second transmit-receive switch for converting command signals from said command transmitter into acoustic energy and transmitting said acoustic energy through the water and for receiving acoustic energy indicative of video data signals transmitted through the water and converting the same into said video data signals to be coupled through said second transmit-receive switch to said video data receiver.

13. The system of claim 12 wherein said video data transmitter and receiver are caused to operate at approximately 14.5 kHz and said command transmitter and receiver caused to operate at approximately 9.25 kHz.

14. A cableless underwater unit for producing a camera scene and transmitting an intelligence signal indicative thereof, said unit comprising: a video camera for recording a camera scene; strobe lighting means for lighting said camera scene; slow scan readout means for producing video data indicative of said camera scene at a predetermined rate; an FM mode channel including a voltage controlled oscillator; a delta mode channel including a delta modulation encoder; a PCM mode channel including a PCM modulation encoder; switching means for selecting one of said channels; a data transmitter connected with said selected channel; a command receiver for receiving external command signals; a detector connected between said command receiver and video camera; a PCM decoder and switch means connected between said detector and said video camera; and transducer means connected with said command receiver and said data transmitter for receiving modulated output signals from said data transmitter and converting said signals into acoustic energy and transmitting the same, and for receiving acoustic energy indicative of command signals and converting said acoustic energy into command signals for external control of said unit.

15. A surface unit for controlling and reproducing an acoustically transmitted camera scene, said surface unit comprising: hydrophone and projector means for receiving acoustic energy bearing camera scene intelligence and converting said energy into video signals, and for receiving command signals and converting said signals into acoustic energy and transmitting said energy; a transmit-receive switch connected with said hydrophone and projector means; a data receiver connected with said transmit-receive switch; an FM demodulator connected with said data receiver to receive video signals therefrom; an FM mode channel; a data detector; a delta mode channel having a delta encoder connected with said data detector; a PCM mode channel having a PCM decoder connected with said data detector; a TV monitor; switching means for selecting one of said channels for connection between said frequency discriminator and said TV monitor; a film recorder connected with said TV monitor; a command generator; and a command transmitter the output of which is coupled to said transmit-receive switch.

16. An acoustically linked television system for viewing an underwater camera scene, said system comprising: an underwater unit including a video camera for recording a camera scene, lighting means for lighting said camera scene, readout means for producing video data indicative of said camera scene, video data processing means for receiving said video data from said readout means and producing video data output signals, and control means for controlling operation of said underwater unit; a surface unit including command means for producing command signals, video data processing means for receiving video data after transmission, and display means for substantially reproducing a camera scene from received video data processed by said surface unit video data processing means; and acoustic linking means having a first section connected with said surface unit and a second section connected with said underwater unit whereby command signals are converted to acoustic energy at said first section and transmitted through the water to said second section where said signals are reconverted from acoustic energy to said command signals to control said control means in said underwater unit, and whereby said video data signals are converted to acoustic energy at said second section and transmitted through the water to said first section where said signals are reconverted from acoustic energy to video data signals which are processed to produce said camera scene at said display means.

17. A cableless underwater unit for producing a camera scene and transmitting an intelligence signal indicative thereof through a water medium, said unit comprising: a video camera for recording a camera scene; lighting means for lighting said camera scene; readout means for producing video data indicative of said camera scene; an FM mode channel including a voltage controlled oscillator; a delta mode channel including a delta modulation encoder; a PCM mode channel including a PCM modulation encoder; switching means for selecting one of said channels; a data transmitter connected with said selected channel; and transducer means connected with said data transmitter for receiving modulated output signals from said data transmitter and converting said signals into acoustic energy and transmitting the same through said water medium.

18. A cableless underwater unit for producing a camera scene and transmitting an intelligence signal indicative thereof through a water medium, said unit comprising: a video camera for recording a camera scene; lighting means for lighting said camera scene; readout means for producing video data indicative of said camera scene; processing means connected with said video means; a data transmitter connected with said processing means; control means for controlling operation of said underwater unit; and transducer means including a first section connected with said data transmitter for receiving modulated output signals from said data transmitter and converting said signals into acoustic energy and transmitting the same through said water medium and a second section adapted to receive command signals in the form of acoustic energy from said water medium and to convert the acoustic energy to command signals for controlling said control means in said underwater unit.

19. A surface unit for controlling and reproducing an acoustically transmitted camera scene, said surface unit comprising: hydrophone and projector means for receiving an acoustic energy bearing camera scene intelligence and converting said energy into video signals, and for receiving command signals and converting said signals into acoustic energy and transmitting said energy; a transmit-receive switch connected with said hydrophone and projector means; processing means connected with said transmit-receive switch to receive and process said video signals; a TV monitor; a film recorder connected with said TV monitor; a command generator; and a command transmitter the output of which is coupled to said transmit-receive switch.

20. A surface unit for controlling and reproducing an acoustically transmitted underwater camera scene, said surface unit comprising: a command generator; a command transmitter connected to said command generator; acoustic linking means for receiving acoustic energy bearing camera scene intelligence from a water medium and converting said energy into video signals, and for receiving command signals from said command transmitter and converting said signals into acoustic energy and transmitting said energy to a water medium; processing means connected with said linking means to receive and process said video signals; and means connected with said processing means for displaying said underwater camera scene.

* * * * *